United States Patent
Xiang

(10) Patent No.: US 9,025,291 B2
(45) Date of Patent: May 5, 2015

(54) PROTECTIVE DEVICE AND METHOD FOR PREVENTING SUPPLY VOLTAGE SAG OF MICROCONTROLLER FROM SAGIN ELECTRONIC CIGARETTE

(71) Applicant: Zhiyong Xiang, Shenzhen (CN)

(72) Inventor: Zhiyong Xiang, Shenzhen (CN)

(73) Assignee: Kimree Hi-Tech Inc, Road Town, Tortola (VG)

( * ) Notice: Subject to any disclaimer, the term of this patent is extended or adjusted under 35 U.S.C. 154(b) by 64 days.

(21) Appl. No.: 13/867,736

(22) Filed: Apr. 22, 2013

(65) Prior Publication Data

US 2014/0258741 A1 Sep. 11, 2014

(30) Foreign Application Priority Data

Mar. 5, 2013 (CN) .......................... 2013 1 0069936

(51) Int. Cl.
*H02H 7/20* (2006.01)
*G06F 1/26* (2006.01)
*G06F 1/30* (2006.01)
*A24F 47/00* (2006.01)

(52) U.S. Cl.
CPC .................. *G06F 1/26* (2013.01); *A24F 47/008* (2013.01); *H02H 7/20* (2013.01); *G06F 1/30* (2013.01)

(58) Field of Classification Search
USPC ....................................... 361/93.1
See application file for complete search history.

(56) References Cited

U.S. PATENT DOCUMENTS

| | | | |
|---|---|---|---|
| 8,000,072 B2* | 8/2011 | Bauer et al. ..................... | 361/87 |
| 8,618,769 B2* | 12/2013 | Johnson ........................ | 320/107 |
| 2005/0040792 A1* | 2/2005 | Nair .............................. | 320/162 |
| 2010/0242974 A1* | 9/2010 | Pan ............................... | 131/273 |
| 2011/0265806 A1* | 11/2011 | Alarcon et al. ................ | 131/273 |
| 2014/0230835 A1* | 8/2014 | Saliman ........................ | 131/329 |
| 2014/0254055 A1* | 9/2014 | Xiang ............................ | 361/86 |
| 2014/0258741 A1* | 9/2014 | Xiang ............................ | 713/300 |
| 2014/0270727 A1* | 9/2014 | Ampolini et al. ............. | 392/387 |
| 2014/0291179 A1* | 10/2014 | Xiang ........................... | 206/216 |

* cited by examiner

*Primary Examiner* — Ronald W Leja
(74) *Attorney, Agent, or Firm* — Morris Manning & Martin LLP; Tim Tingkang Xia, Esq.

(57) ABSTRACT

A protective device and method for preventing supply voltage of microcontroller from sag in electronic cigarette is provided, comprising a microcontroller, a power supply module, a field effect transistor, an energy storage circuit, wherein, the energy storage circuit is connected between the microcontroller and the power supply module, the energy storage circuit supplies electric power to the microcontroller when an over current or short circuit occurs, and maintains the supply voltage of the microcontroller not being less than its minimal operating voltage in a certain period of time; the microcontroller processes the over current or short circuit signal and turns off the MOSFET to cut off the current flow in a load circuit. The unstable or uncontrollable phenomena of the microcontroller in the existing technology are resolved. The circuit of the present invention is simple and low cost.

6 Claims, 4 Drawing Sheets

PROTECTIVE DEVICE AND METHOD FOR PREVENTING SUPPLY VOLTAGE SAG OF MICROCONTROLLER FROM SAGIN ELECTRONIC CIGARETTE

CROSS-REFERENCE TO RELATED APPLICATIONS

This non-provisional application claims priority under 35 U.S.C. §119(a) on Patent Application No. 201310069936.5 filed in P.R. China on Mar. 5, 2013, the entire contents of which are hereby incorporated by reference.

FIELD OF THE INVENTION

The present invention relates to the field of electronic cigarette and electronic cigarette case technology, more particularly, relates to an electronic cigarette and electronic cigarette case with a microcontroller, and a protective device and method for preventing supply voltage of microcontroller from sag.

BACKGROUND OF THE INVENTION

Today in most of electronic cigarette and electronic cigarette case, a microcontroller is directly supplied electric power by a battery, the microcontroller powers on or off a load via controlling a switch field effect transistor (hereinafter, referred to as "MOSFET"), as shown in FIGS. 1 and 2, a circuit of the electronic cigarette contains a battery 100, a microcontroller 200 and a field effect transistor 300, wherein battery 100 is used to supply electric power to both microcontroller 200 and the load, microcontroller 200 is used to output a control signal to turn on or off the field effect transistor 300 for controlling the heating element of the electronic cigarette and electronic cigarette case. There are some risks of the power supply structure of FIGS. 1 and 2, such as, when the MOSFET is turned on and if the load circuit is in short circuit or over current condition, an output voltage of the battery applied as a supply voltage of the microcontroller drops rapidly, further in case that the supply voltage of the microcontroller drops below minimal operating voltage of the microcontroller, the microcontroller becomes uncontrollable or unstable state. The internal components and wires of the electronic cigarette may be damaged by excess current caused by the over current or short circuit.

The uncontrollable state of the microcontroller may lead to other unexpected damage, so it is necessary to develop a circuit to delay the supply voltage of the microcontroller dropping.

Therefore, the existing technology has flaws, and needs to be improved.

SUMMARY OF THE INVENTION

A proposal of solution to the technical problem is to focus on short circuit and over current of an electronic cigarette, which lead to damage internal component and wire or other defects that may arise. The solution is to include a protective device or method which involves an energy storage circuit inside the electronic cigarette which delays the supply voltage dropping, thus achieving the purpose of circuit protection.

The technical solutions of the present invention for solving the technical problems are as follows:

A protective device for preventing a supply voltage of a microcontroller from sag in an electronic cigarette is provided, which comprises a microcontroller, a power supply module and a field effect transistor, the power supply module is used to output a supply voltage to both the microcontroller and a load, wherein further comprises an energy storage circuit, the energy storage circuit is connected between the microcontroller and the power supply module, when an over current or short circuit occurs in the load circuit, the energy storage circuit supplies a backup electric power to the microcontroller, which delays the supply voltage of the microcontroller dropping in a certain period of time. The microcontroller can use the period of time to process the over current or short circuit signal, the signal is transmitted from an over current or short circuit detection module to the microcontroller, and outputs a control signal to turn off the field effect transistor.

Advantageously, wherein the energy storage circuit comprises a diode and an energy storage capacitor, the positive electrode of the diode is connected to the positive electrode of the power supply module, the negative electrode of the diode is connected to the positive supply terminal of the microcontroller and a first terminal of the capacitor, a second terminal of the capacitor is connected to the negative electrode of the power supply module and the negative supply terminal of the microcontroller, when an output voltage of the power supply module drops, which is caused by the over current or short circuit, the capacitor of the energy storage circuit begins to supply electric power to the microcontroller while discharging and a discharging path from the capacitor following via the power supply module is cut off by the diode.

Advantageously, wherein the energy storage circuit comprises a diode and an energy storage capacitor, a first terminal of the capacitor is connected to the positive electrode of a power supply module and the positive supply terminal of the microcontroller, a second terminal of the capacitor is connected to the positive electrode of the diode and the negative supply terminal of the microcontroller, the negative electrode of the diode is connected to the negative electrode of the power supply module, when an output voltage of the power supply module drops, caused by over current or short circuit, the capacitor of the energy storage circuit begins to supply electric power to the microcontroller and prevents a supply voltage of the microcontroller from dropping rapidly, also a discharging path form the capacitor following via the power module is cut off by the diode.

Advantageously, wherein also comprising an over current or short circuit detection module, the over current or short circuit detection module is used to real-time detect the operating current of the load circuit and transmits a detection signal to the microcontroller.

Advantageously, wherein a signal output terminal of the microcontroller is connected to the gate of the field effect transistor, the source of the field effect transistor is connected to the negative electrode of the power supply module, and the drain of the field effect transistor is connected to the load.

Advantageously, wherein the signal output terminal of the microcontroller is connected to the gate of the field effect transistor, the source of the field effect transistor is connected to the external load, and the drain of the field effect transistor is connected to the positive electrode of the power supply module and the positive electrode of the diode.

Advantageously, wherein the signal output terminal of the microcontroller is connected to the gate of the field effect transistor, the source of the field effect transistor is connected to the negative electrode of the power supply module and the negative electrode of the diode, and the drain of the field effect transistor is connected to the load.

Advantageously, wherein the signal output terminal of the microcontroller is connected to the gate of the field effect transistor, the drain of the field effect transistor is connected to the positive electrode of the power supply module, a first terminal of the capacitor and the positive supply terminal of the microcontroller, and the source of the field effect transistor is connected to the load.

Advantageously, wherein the microcontroller is configured as Single Chip Microcomputer or CPU.

A method for preventing a supply voltage of a microcontroller from sag in an electronic cigarette, the method comprising:

an energy storage circuit connected between a microcontroller and a power module, delaying a supply voltage of the microcontroller dropping when an over current or short circuit occurs, and maintaining the supply voltage of the microcontroller being not less than its minimal operating voltage in a certain period of time; and the microcontroller processing the over current or short circuit signal in the certain period of time and outputting a control signal to turn off the field effect transistor to cut off the over current flow.

Advantageously, wherein the energy storage circuit comprises a diode and an energy storage capacitor; the positive electrode of the diode is connected to the positive electrode of the power supply module, the negative electrode of the diode is connected to a first terminal of the capacitor and the positive supply terminal of the microcontroller, and a second terminal of the capacitor is connected to the negative supply terminal of the microcontroller and the negative electrode of the power supply module; and the certain period of time is a discharge time of the capacitor.

Advantageously, wherein the energy storage circuit comprises a diode and an energy storage capacitor; a first terminal of the capacitor is connected to the positive electrode of the power supply module and the positive supply terminal of the microcontroller, a second terminal of the capacitor is connected to the positive electrode of the diode and the negative supply terminal of the microcontroller, and the negative electrode of the diode is connected to the negative electrode of the power supply module; and the certain period of time is the discharge time of the capacitor.

Advantageously, wherein the discharge time is when the energy storage capacitor voltage drops while discharging to supply electric power to microcontroller from normal operating voltage to minimal operating voltage of the microcontroller.

The present invention discloses a protective device and method for preventing a supply voltage of a microcontroller from sagin an electronic cigarette, the following advantageous effects can be achieved: an energy storage circuit is connected between a microcontroller and a power supply module, the energy storage circuit begins to supply electric power to the microcontroller when the over current or short circuit occurs, and maintains a supply voltage of the microcontroller being not less than its minimal operating voltage in a certain period of time, then the microcontroller turns off the MOSFET according to the over current or short circuit signal transmitted, therefore the output current flow is cut off, and the electronic cigarette circuit is protected. The circuit of the present invention is simple and low cost, and resolves the problem that the microcontroller becomes unstable or uncontrollable when over current or short circuit happens in the existing technology.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To solve the drawbacks that a microcontroller in an electronic cigarette becomes uncontrollable or unstable in an over current or circuit short condition, which results in internal components and wires circuit of the electronic cigarette being damaged by excess current caused by the over current or short circuit, a protective device and method for delaying a supply voltage of a microcontroller dropping is provided, the core ideas are as follows: an energy storage circuit is connected between the microcontroller and a power supply module, the energy storage circuit is used to supply a backup power supply to the microcontroller in a certain period of time. When the over current or short circuit happens in a load circuit in the electronic cigarette, an output voltage of the power supply module is pulled down by the over current, and the supply voltage of the microcontroller is going to drop rapidly, at this moment the energy storage circuit begins to supply electric power to the microcontroller in a certain of time, which avoids that the supply voltage of the microcontroller drops rapidly resulting in the microcontroller malfunction, the microcontroller has the certain period time to process the over current or short circuit signal received and to output control signal to turn off the field effect transistor to power off the load, realizing the protection of over current or short circuit for the electronic cigarette, solving the problem that the microcontroller is unstable or uncontrollable in the over current or short condition in the existing technology.

To make the technical solution, objective and effect of the present invention be understood more clearly, now the specific implementation of the present invention is described in detail with reference to the accompanying drawings and embodiments. While the specific embodiments of the present invention have been described here, it should be understand that they have been presented by way of example only, and not limitation.

Figure 1:
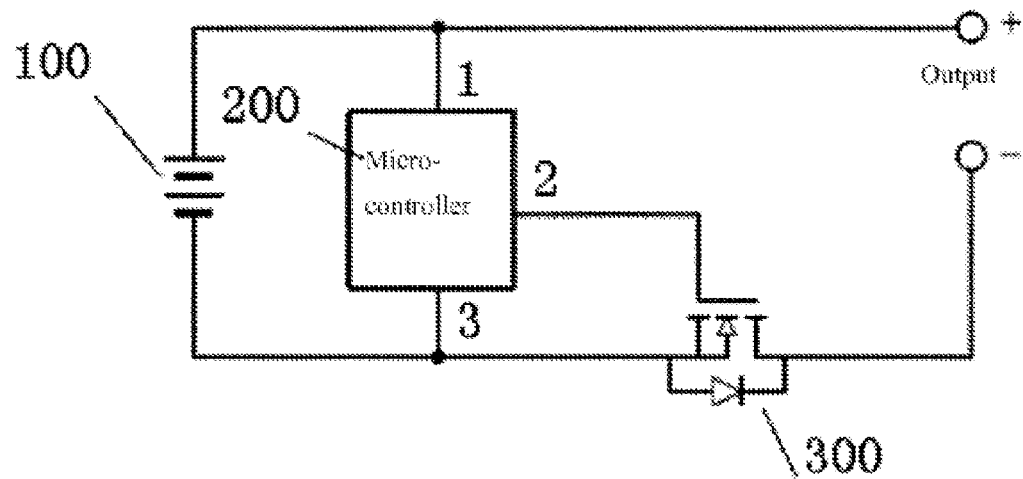
FIG. 1 is a schematic diagram of a first exemplary embodiment of a supply circuit of a microcontroller in an electronic cigarette according to the existing technology.
Figure 2:
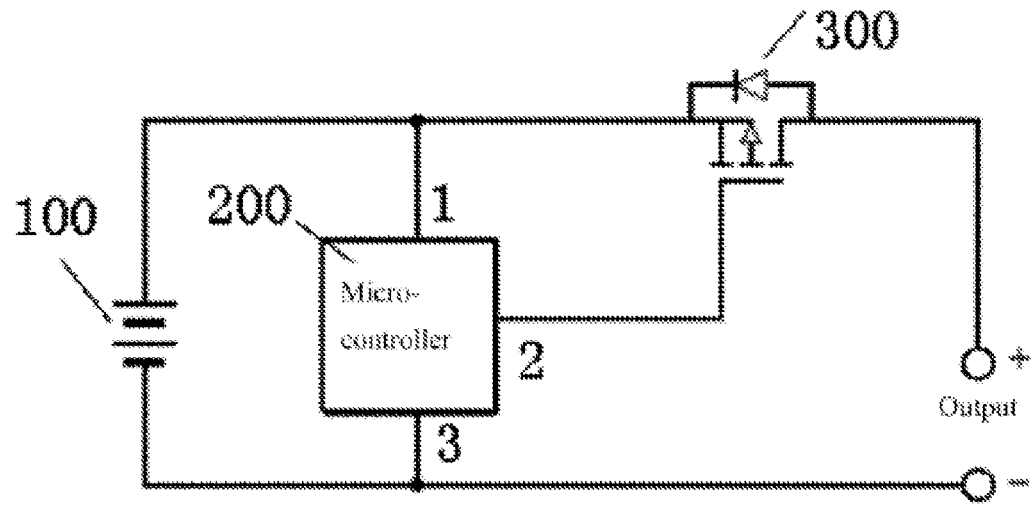
FIG. 2 is a schematic diagram of a second exemplary embodiment of a supply circuit of a microcontroller in an electronic cigarette according to the existing technology.
Figure 3:
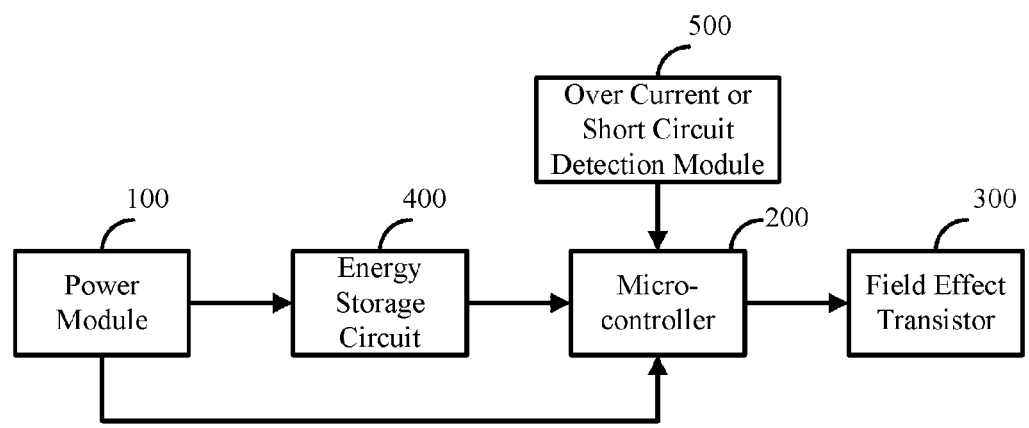
FIG. 3 is a block diagram of a protective device for preventing a supply voltage of a microcontroller from sag according to the present invention.

FIG. 3 is a block diagram for a protective device for preventing a supply voltage of microcontroller from sag in the present invention, wherein, the protective device comprises a power supply module 100, a microcontroller 200, a field effect transistor 300, an energy storage circuit 400 and an over current or short circuit detection module 500, the over current or short circuit detection module 500 is used to real-time detect the operating current of the circuit, and provide the microcontroller with detection signal; energy storage circuit 400 is provided between power module 100 and microcontroller 200, power module 100 is connected to microcontroller 200, and power module 100 is used to supply electric power to both microcontroller 200 and a load (no shown in the FIG.), energy storage circuit 400 is used to supply electric power to microcontroller 200 to maintain a supply voltage of microcontroller 200 not less than its minimal operating voltage in a certain period of time when the supply voltage of microcontroller 200 drops, microcontroller 200 is connected to field effect transistor 300 and over current or short circuit detection module 500, microcontroller 200 is used to detect and determine the occurrence of over current or short circuit, and process the over current or short circuit signal, then output control signal to turn off field effect transistor 300, thus achieving the purpose of circuit protection.

Wherein microcontroller 200 of the present invention can be Single Chip Microcomputer, CPU or logic control device, microcontroller 200 comprises three pins, a first pin is as positive supply power terminal of microcontroller 200, the third pin is as negative supply terminal of microcontroller 200, the second pin is as signal output terminal, power supply module 100 is rechargeable battery, model of field effect transistor 300 is preferably AO3400 or DTS2300, not limited to the above model in practice.

The energy storage circuit of the present invention comprises a diode D and an energy storage capacitor C, in specific embodiment 1 (see FIG. 4), the positive electrode of the diode D is connected to the positive electrode of battery 100, the negative electrode of the diode D is connected to the first pin (the positive power terminal of microcontroller 200 and a first terminal of the energy storage capacitor C, a second terminal of the storage capacitor C is connected to the negative electrode of battery 100 and the third pin of microcontroller 100, when an output voltage of battery 100 drops caused by the over current or short circuit, the energy storage capacitor C of energy storage circuit 400 is used to supply electric power to microcontroller 200 while discharging, a discharging path following from energy storage capacitor C via battery 100 is cut off by the diode D, the second pin of microcontroller 200 is connected to the gate of field effect transistor 300, the source of the field effect transistor 300 is connected to the negative electrode of battery 100, the drain of field effect transistor 300 is connected to the load.

Figure 4:
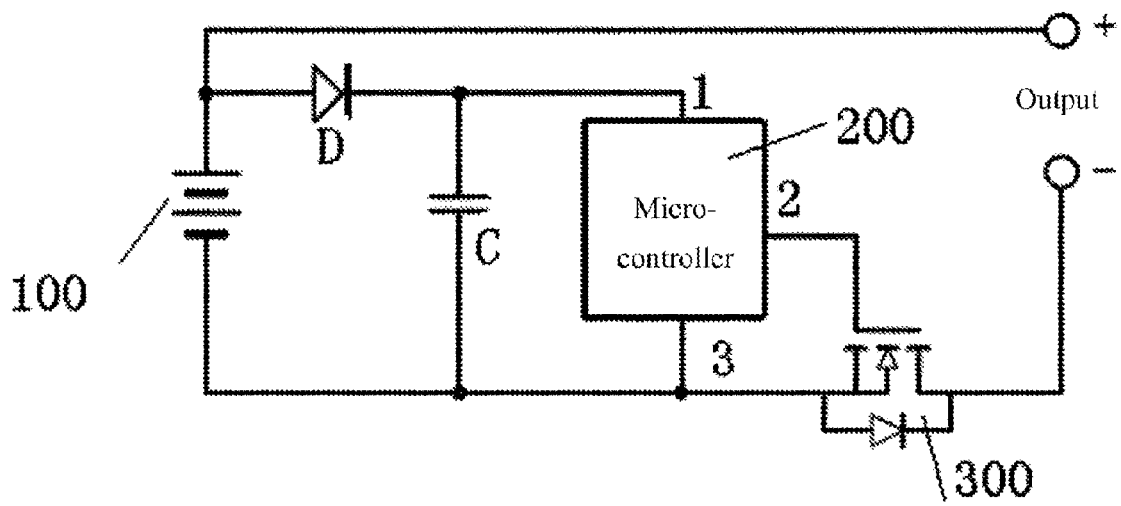
FIG. 4 is a circuit schematic diagram of a first exemplary embodiment of a protective device for preventing a supply voltage of a microcontroller from sag according to the present invention.
Figure 5:
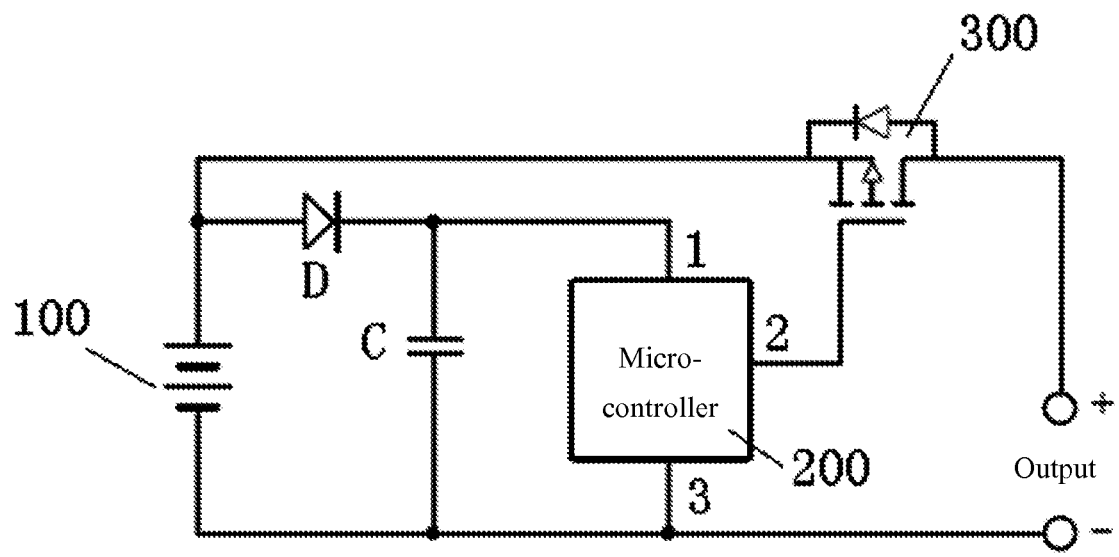
FIG. 5 is a circuit schematic diagram of a second exemplary embodiment of a protective device for preventing a supply voltage of a microcontroller from sag according to the present invention.

In specific embodiment 2 (see FIG. 5), the positive electrode of the diode D is connected to the positive electrode of battery 100, the negative electrode of the diode D is connected to the first pin (the positive power terminal) of microcontroller 200 and a first terminal of the storage capacitor C, a second terminal of the storage capacitor C is connected to the negative electrode of battery 100 and the third pin of microcontroller 200, when an output voltage of the battery 100 drops caused by the over current or short circuit, the energy storage capacitor C of energy storage circuit 400 supplies electric power for microcontroller 200 while discharging, and a discharging path following from energy storage capacitor C via battery 100 is cut off by the diode D. The second pin of microcontroller 200 is connected to the gate of field effect transistor 300, the source of field effect transistor 300 is connected to the load, the drain of field effect transistor 300 is connected to the positive electrode of battery 100 and the positive electrode of the diode D. In the embodiment 1 and embodiment 2, the connection methods of energy storage circuit 400 connected between battery 100 and microcontroller 200 in the circuit are same, the connection method of energy storage circuit 400 connected to field effect transistor 300 is different, as shown in FIGS. 4 and 5.

In specific embodiment 3 (see FIG. 6), a first terminal of the energy storage capacitor C of energy storage circuit 400 is connected to the positive electrode of battery 100 and the positive supply terminal (the first pin) of microcontroller 200, a second terminal of the storage capacitor C is connected to the positive electrode of the diode D and the negative power terminal (the third pin) of microcontroller 200, the negative electrode of the diode D is connected to the negative electrode of battery 100, when an output voltage of battery 100 drops caused by the over current or short circuit, the energy storage capacitor C of energy storage circuit 400 supplies electric power to microcontroller 200 and delays the supply voltage of microcontroller 200 dropping rapidly, and a discharging path following from energy storage capacitor C via battery 100 is cut off by the diode D. The signal output terminal (the second pin) of microcontroller 200 in the embodiment is connected to the gate of field effect transistor 300, the source of field effect transistor 300 is connected the negative electrode of battery 100 and the negative electrode of the diode D, the drain of field effect transistor 300 is connected to the load.

Figure 6:
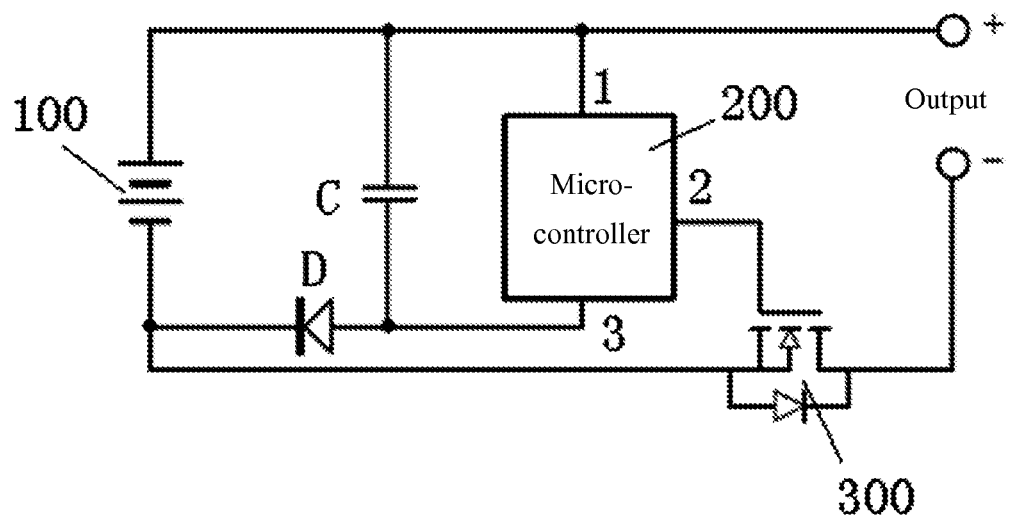
FIG. 6 is a circuit schematic diagram of a third exemplary embodiment of a protective device for preventing a supply voltage of a microcontroller from sag according to the present invention.
Figure 7:
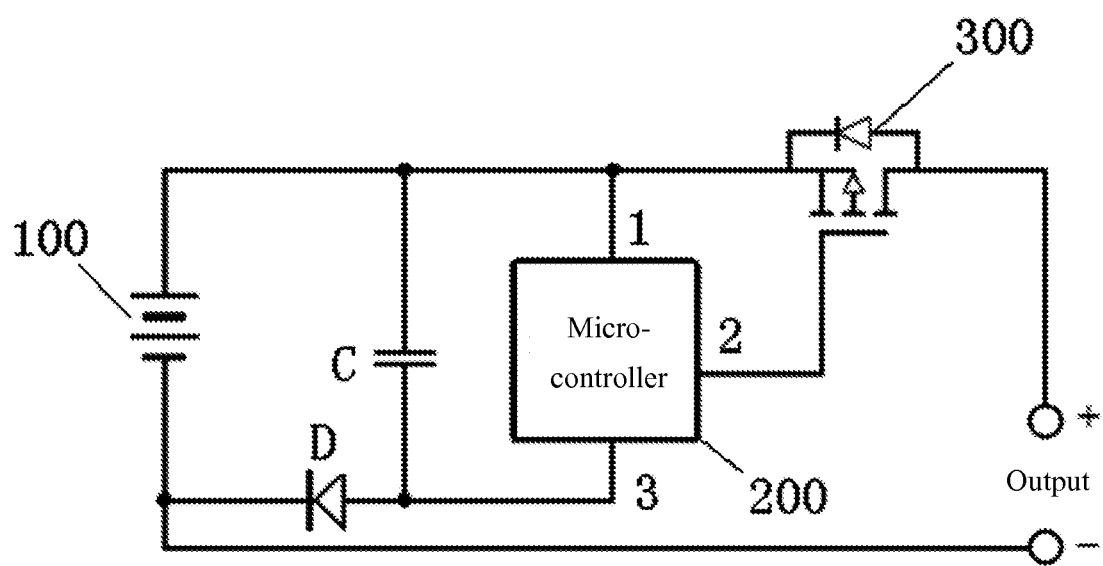
FIG. 7 is a circuit schematic diagram of a fourth exemplary embodiment of a protective device for preventing a supply voltage of a microcontroller from sag according to the present invention.

In specific embodiment 4 (see FIG. 7), a first terminal of the energy storage capacitor C of energy storage circuit 400 is connected to the positive electrode of battery 100 and the positive supply terminal (the first pin) of microcontroller 200, a second terminal of the energy storage capacitor C is connected to the positive electrode of the diode D and the negative supply terminal (the third pin) of microcontroller 200, the negative electrode of the diode D is connected to the negative electrode of battery 100, when an output voltage of battery 100 drops caused by the over current or short circuit, the energy storage capacitor C of the energy storage circuit 400 supplies electric power to microcontroller 200 and delays the supply voltage of microcontroller 200 dropping rapidly, and a discharging path following from the storage capacitor C via battery 100 is cut off by the diode D. The signal output terminal (the second pin) of microcontroller 200 in the embodiment is connected to the gate of field effect transistor 300, the drain of field effect transistor 300 is connected to the positive electrode of battery 100, a terminal of the energy storage capacitor C and the positive supply terminal (the first pin) of microcontroller 200, the source of the field effect transistor 300 is connected to the load; in the embodiment 3 and embodiment 4, the connection methods of energy storage circuit 400 connected between battery 100 and microcontroller 200 in the circuits are same, the connection methods of energy storage circuit 400 with the field effect transistor 300 are different, as shown in FIGS. 6 and 7.

when an output voltage of the power module drops caused by the over current or short circuit, by exploiting capacitor characteristics that capacitor voltage cannot be mutated, the energy storage capacitor C of the energy storage circuit supplies electric power to the microcontroller, and by exploiting unidirectional conductivity of diode, discharging paths following from the energy storage capacitor C respectively via the battery and the load are all cut off by the diode D.

The method for preventing a supply voltage of a microcontroller from sag in the present invention comprises the following step:

S1: real-time detecting an operating current of a load circuit, and providing the microcontroller with a detection signal, when an over current or short circuit is detected, at the same time an output supply voltage of a battery drops;

S2: an energy storage circuit coupled between the microcontroller and the battery begins to supply electric power to the microcontroller and discourages the supply voltage of the microcontroller dropping, and maintains the supply voltage of the microcontroller being not less than its minimal operating voltage in a certain period of time;

S3: the microcontroller processes the over current or short circuit signal in the certain period of time and outputs control signal to turn off the field effect transistor to cut off the current follow.

As shown in FIGS. 4 and 5, a certain period of time for the microcontroller is the discharge time of the energy storage capacitor C; as shown in FIGS. 6 and 7, a certain period of time for the microcontroller is the discharge time of the energy storage capacitor C, the discharging time is when the energy storage capacitor voltage drops while discharging to supply electric power to the microcontroller from normal operating voltage to minimal operating voltage of the microcontroller.

When an output voltage of the power module drops caused by the over current or short circuit, by exploiting capacitor characteristics that capacitor voltage cannot be mutated, the energy storage capacitor of the energy storage circuit supplies electric power to the microcontroller, and by exploiting unidirectional conductivity of diode, discharging paths following from the energy storage capacitor respectively via both the battery and the load are all cut off by the diode.

In conclusion, since an energy storage circuit is connected between the microcontroller and the battery, the energy storage circuit supplies electric power to the microcontroller to delay a supply voltage of the microcontroller dropping when an over current or short circuit occurs, and maintains the supply voltage of the microcontroller being not less than its minimal operating voltage in a certain period of time; the microcontroller processes the over current or short circuit signal in the certain period of time, and outputs control signal to turn off the field effect transistor for cutting off the current flow. The unstable or uncontrollable phenomenon of the microcontroller in the existing technology is resolved, so enabling effective implementation of protection of over current or short circuit for the electronic cigarette.

Therefore, the present invention is not limited to the pubic specific embodiment, should comprise all embodiments that fall with the range of claims.

The invention claimed is:

1. A protective device for preventing a supply voltage of a microcontroller from sag in an electronic cigarette, comprising
    a microcontroller;
    a power supply module used to output a supply voltage to the microcontroller and a load;
    a field effect transistor;
    an over current or short circuit detection module, used to real-time detect an operating current of a load circuit, and to provide the microcontroller with detection signal; and
    an energy storage circuit, connected between the microcontroller and the power supply module and used to supply electric power to the microcontroller and to delay the supply voltage of the microcontroller from sag in a certain period of time when an over current or short circuit occurs in the load circuit; and the microcontroller is used to process the over current or short circuit signal in the certain period of time and output control signal to turn off the field effect transistor;
    wherein the energy storage circuit comprises a diode and an energy storage capacitor, the positive electrode of the diode is connected to the positive electrode of the power supply module, the negative electrode of the diode is connected to the positive supply terminal of the microcontroller and a first terminal of the storage capacitor, a second terminal of the energy storage capacitor is connected to the negative electrode of the power supply module and the negative supply terminal of the microcontroller; and
    wherein when an output voltage of the power module drops caused by the over current or short circuit, the energy storage capacitor of the energy storage circuit supplies electric power to the microcontroller, and a discharging path from the energy storage capacitor following via the power module is cut off by the diode.

2. The protective device for preventing the supply voltage of the microcontroller from sag according to claim 1, wherein the signal output terminal of the microcontroller is connected to the gate of the field effect transistor, the source of the field effect transistor is connected to the negative electrode of the power module, the drain of the field effect transistor is connected to the load.

3. The protective device for preventing the supply voltage of the microcontroller from sag according to claim 1, wherein the signal output terminal of the microcontroller is connected to the gate of the field effect transistor, the source of the field effect transistor is connected to the external load, the drain of the field effect transistor is connected to the positive electrode of the power supply module and the positive electrode of the diode.

4. The protective device for preventing the supply voltage of the microcontroller from sag according to claim 1, wherein the microcontroller is configured as Single Chip Microcomputer or CPU.

5. A method for preventing a supply voltage of a microcontroller from sag in an electrode cigarette, wherein the method comprising:
    real-time detecting an operating current of a load circuit, and providing the microcontroller with a detection signal, when an over current or short circuit is detected, at the same time an output supply voltage of a battery drops;
    an energy storage circuit connected between the microcontroller and a power module, delaying the supply voltage of the microcontroller dropping when an over current or short circuit occurs, and maintaining the supply voltage of the microcontroller being not less than its minimal operating voltage in a certain period of time; and
    the microcontroller processing the over current or short circuit signal in the certain period of time and outputting control signal to turn off the field effect transistor for cutting off current flow in the load circuit;
    wherein the energy storage circuit comprises a diode and an energy storage capacitor, the positive electrode of the diode is connected to the power supply module, the negative electrode of the diode is connected to a first terminal of the storage capacitor and the microcontroller, a second terminal of the storage capacitor is connected to the negative supply terminal of the microcontroller and the negative electrode of the power supply module; and
    wherein the certain period of time is the discharge time of the energy storage capacitor.

6. The method for preventing the supply voltage of the microcontroller from sag according to claim 5, wherein the discharge time is when the energy capacitor voltage drops while discharging to supply electric power to the microcontroller from normal operating voltage to minimal operating voltage of the microcontroller.

* * * * *